United States Patent
Hirose et al.

(10) Patent No.: US 7,503,665 B2
(45) Date of Patent: Mar. 17, 2009

(54) POLYGON MIRROR AND POLYGON MIRROR DEVICE

(75) Inventors: Kazuya Hirose, Kamiina-gun (JP); Fumito Orii, Chino (JP); Kenji Haga, Kamiina-gun (JP); Isao Tsubouchi, Suwa (JP); Toru Takahashi, Kamiina-gun (JP); Katsuaki Yakata, Matsumoto (JP)

(73) Assignee: Olympus Corporation, Tokyo (JP)

( * ) Notice: Subject to any disclaimer, the term of this patent is extended or adjusted under 35 U.S.C. 154(b) by 170 days.

(21) Appl. No.: 11/238,026

(22) Filed: Sep. 28, 2005

(65) Prior Publication Data

US 2006/0017993 A1  Jan. 26, 2006

Related U.S. Application Data

(63) Continuation of application No. PCT/JP2005/001142, filed on Jan. 27, 2005.

(30) Foreign Application Priority Data

Jan. 30, 2004 (JP) ............................. 2004-024336

(51) Int. Cl.
*G02B 5/09* (2006.01)
*G02B 26/08* (2006.01)

(52) U.S. Cl. .................... 359/850; 359/198; 359/216; 359/855

(58) Field of Classification Search .................. None
See application file for complete search history.

(56) References Cited

U.S. PATENT DOCUMENTS 4,892,372 A * 1/1990 Chonan et al. ............... 359/218
5,113,280 A * 5/1992 Kawasaki et al. ........... 359/196
6,427,916 B1    8/2002 Ishii et al.

FOREIGN PATENT DOCUMENTS

| JP | 2-87215 U | 7/1990 |
|---|---|---|
| JP | 6-123846 A | 5/1994 |
| JP | 10-186116 A | 7/1998 |
| JP | 11-212017 A | 8/1999 |
| JP | 11-249055 A | 9/1999 |
| JP | 2000-292732 A | 10/2000 |

* cited by examiner

*Primary Examiner*—James Phan
(74) *Attorney, Agent, or Firm*—Frishauf, Holtz, Goodman & Chick, P.C.

(57) ABSTRACT

A polygon mirror includes a mounting portion and a plurality of reflective surfaces. The mounting portion is mounted on a rotating body having a support surface. The mounting portion has the shape of a polygonal plate. The plurality of reflective surfaces are arranged around the rotating body so as to surround the rotating body. A plurality of protrusions configured to abut against the support surface of the rotating body are arranged on one side of the mounting portion.

4 Claims, 7 Drawing Sheets

POLYGON MIRROR AND POLYGON MIRROR DEVICE

CROSS REFERENCE TO RELATED APPLICATIONS

This is a Continuation Application of PCT Application No. PCT/JP2005/001142, filed Jan. 27, 2005, which was published under PCT Article 21(2) in Japanese.

This application is based upon and claims the benefit of priority from prior Japanese Patent Application No. 2004-024336, filed Jan. 30, 2004, the entire contents of which are incorporated herein by reference.

BACKGROUND OF THE INVENTION

1. Field of the Invention

The present invention relates to a polygon mirror and a polygon mirror device having the polygon mirror incorporated therein.

2. Description of the Related Art

A polygon mirror is provided with a plurality of reflective surfaces. The polygon mirror rotates to move the reflective surfaces, thereby switching the optical path of light reflected by the reflective surfaces or scanning the light. In order to perform this operation, the polygon mirror must be mounted with high accuracy on a rotating body. An example of a polygon mirror that can be mounted with high accuracy on a rotating body is described in Jpn. Pat. Appln. KOKAI Publication No. 2000-292732.

In this polygon mirror, a center core is provided in a central part of an optical surface core that reflects light. This center core has an axially symmetrical through hole that is penetrated by a rotating shaft of the rotating body, and is generally formed of a stiff resin material. The polygon mirror can be mounted with high accuracy on the rotating body by passing the rotating shaft of the rotating body through the through hole of the center core.

BRIEF SUMMARY OF THE INVENTION

A polygon mirror according to an aspect the present invention includes a plate-like mounting portion in the shape of a polygon mounted on a rotating body having a support surface, a plurality of reflective surfaces formed integrally with the mounting portion and arranged around the rotating body so as to surround the rotating body, and a plurality of protrusions provided on one side of the mounting portion and configured to abut against the support surface of the rotating body.

Further, a polygon mirror device according to an aspect of the present invention includes a rotating body having a support surface, a polygon mirror having a plate-like mounting portion in the shape of a polygon mounted on the rotating body, a plurality of reflective surfaces formed integrally with the mounting portion and arranged around the rotating body so as to surround the rotating body, and a plurality of protrusions provided on one side of the mounting portion and configured to abut against the support surface of the rotating body, and a spring member mounted on the rotating body and configured to press the polygon mirror against the rotating body.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The best mode for carrying out this invention will now be described with reference to the drawings.

First, a first embodiment will be described with reference to FIGS. 1 to 3.

A polygon mirror 10 is mounted on a rotating shaft of, e.g., a barcode scanner, laser beam printer, vehicular optical scanner, etc., when it is used. Reflected light can be switched or scanned by rotating the polygon mirror 10 around the given rotating shaft.

Figure 1:
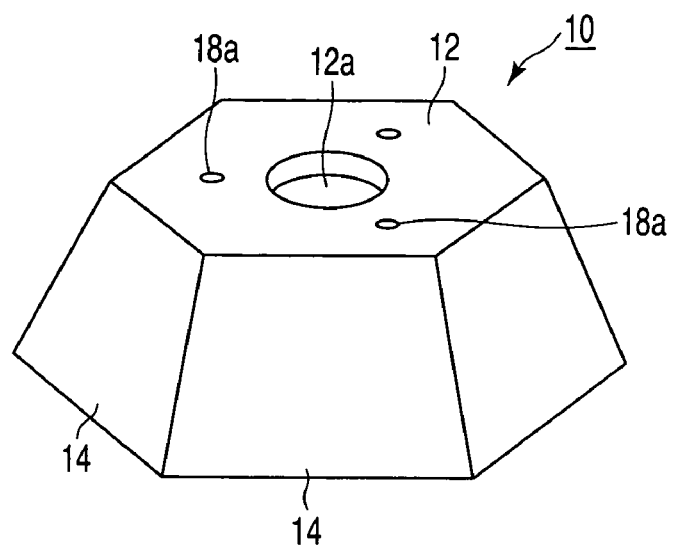
FIG. 1 is a schematic perspective view of a polygon mirror according to a first embodiment of the present invention.

As shown in FIG. 1, the polygon mirror 10 includes a mounting portion 12, which is formed substantially flat on its top portion and mounted on a rotating shaft 32 (see FIG. 3) of a rotating body 30 (mentioned later), and a plurality of reflective surfaces 14 extending diagonally downward from outer edge portions (individual sides) of the mounting portion 12.

The mounting portion 12 and the plurality of reflective surfaces 14 are integrally formed by injection-molding, for example, a thermoplastic resin material. Thus, the polygon mirror 10 is integrally formed of the resin material. The thermoplastic resin material may be, for example, polycarbonate, methacrylic resin, polyarylate, polystyrene, cycloolefin polymer, or other suitable resin material.

The mounting portion 12 has a polygonal shape. This embodiment will be described on the assumption that the mounting portion 12 is molded in the shape of a flat hexagonal plate.

The reflective surfaces 14 are molded so that they extend diagonally downward from the individual sides (outer edge portions) of the hexagon of the mounting portion 12. These reflective surfaces 14 are molded severally or equally in the shape of suitable surfaces, such as flat surfaces, spherical surfaces, rotationally symmetric aspheric surfaces, free curved surfaces, etc. A thin metallic film of aluminum, silver, or gold is applied to the outer surface of each reflective surface 14 to form a specular surface by vapor deposition, sputtering, etc. If light is directed onto the reflective surfaces 14, therefore, it is reflected by the reflective surfaces 14.

Figure 2A:
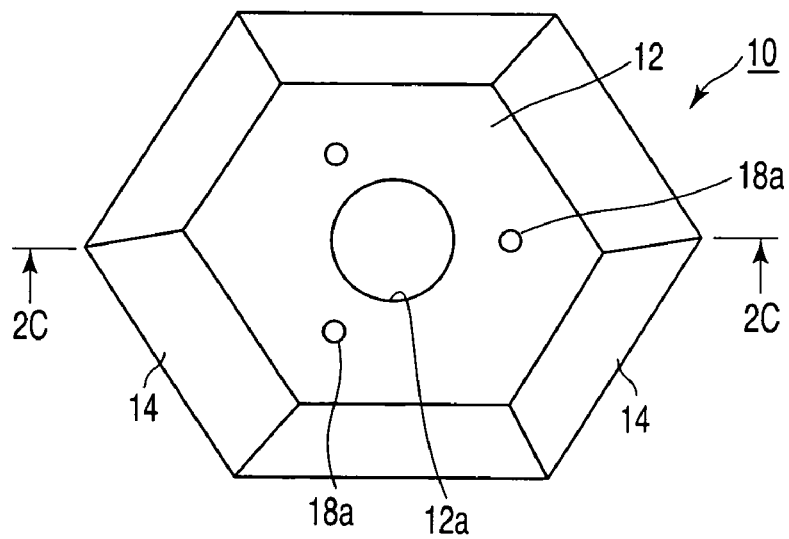
FIG. 2A is a schematic plan view of the polygon mirror according to the first embodiment.

As shown in FIG. 2A, the central part of the mounting portion 12 is formed having a mounting hole 12a that is penetrated by the rotating shaft 32 of the rotating body 30 (see FIG. 3, mentioned later). The rotating shaft 32 is secured within the mounting hole 12a of the polygon mirror 10. Thus, in a mounted state such that the polygon mirror 10 is mounted on the rotating shaft 32, the reflective surfaces 14 are arranged around the rotating shaft 32. In this state, the polygon mirror 10 rotates together with the rotating shaft 32 in a manner such that the reflective surfaces 14 reflect light.

Figure 2B:
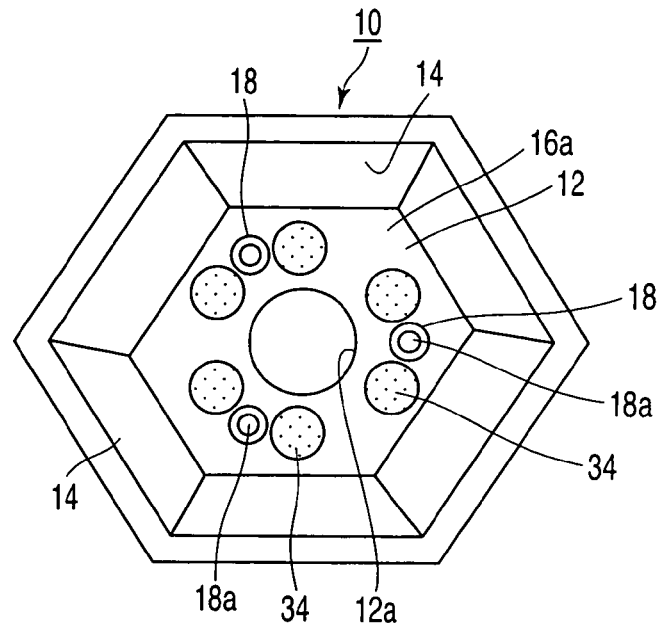
FIG. 2B is a schematic bottom view of the polygon mirror according to the first embodiment.
Figure 2C:
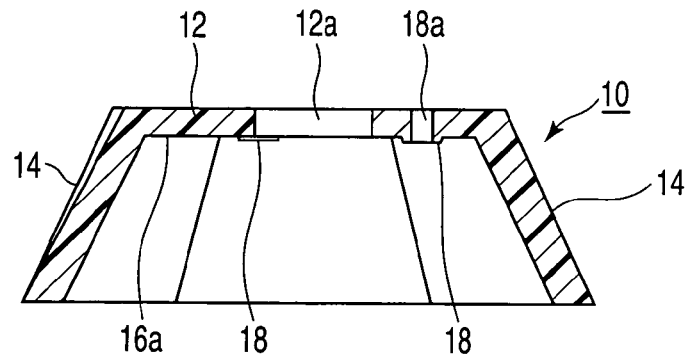
FIG. 2C is a schematic sectional view of the polygon mirror according to the first embodiment taken along line 2C-2C of FIG. 2A.

As shown in FIGS. 2B and 2C, a plurality of protrusions 18 of a given height are formed on a lower surface 16a, one side face of the mounting portion 12, so as to be integral with the mounting portion 12. Each protrusion 18 has the shape of a column, for example. These protrusions 18 are arranged at equal distances from the center of the mounting hole 12a and at regular intervals of 120 degrees. Thus, the protrusions 18 are located individually in three positions on the lower surface 16a of the mounting portion 12. It is necessary only that a plurality of protrusions 18 be formed on the lower surface 16a of the mounting portion 12, and their shape and number and the intervals between them may be changed as required.

Each protrusion 18 is formed having a height equal to or less than 30% of the thickness of the mounting portion 12, and preferably, equal to or less than 20%. Since each protrusion 18 is formed having this height, defective molding, such as sink marks, can be prevented during injection molding operation.

Figure 3:
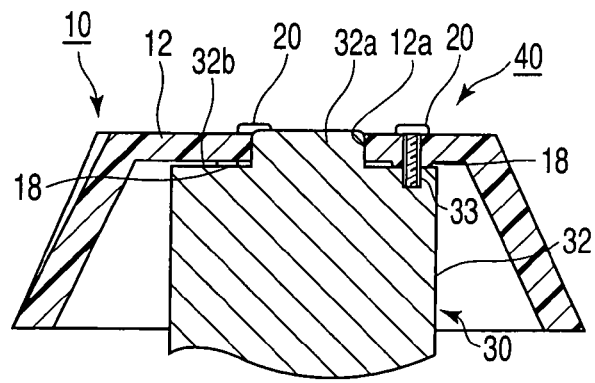
FIG. 3 is a schematic longitudinal sectional view of a polygon mirror device according to the first embodiment.

As shown in FIGS. 2A to 3, each protrusion 18 is penetrated by a through hole 18a along its height direction. As shown in FIG. 3, screws 20 as fastening members for mounting the polygon mirror 10 on the rotating shaft 32 are inserted individually in the through holes 18a. These screws 20 are threadedly fitted in the rotating shaft 32, which will be described later. The through holes 18a are expected only to be formed in any of the protrusions 18 and need not be formed in all the protrusions 18.

As shown in FIG. 3, the rotating body 30 has the rotating shaft 32. A rotating means (not shown), such as a motor, is incorporated in the rotating shaft 32. Thus, the rotating shaft 32 can be rotated by driving the rotating means.

The rotating shaft 32 has a protuberance 32a, which is located on its central axis and configured to be fitted in the mounting hole 12a of the polygon mirror 10, and a support surface 32b, which is formed on the peripheral edge of the protuberance 32a and supports the protrusions 18 of the mounting portion 12. The support surface 32b is formed with tapped holes 33, which are threadedly engaged with the aforesaid screws 20.

When the polygon mirror 10 is mounted on the rotating body 30, the protrusions 18 abut against the support surface 32b of the rotating shaft 32. With this engagement, the polygon mirror 10 can be mounted without being allowed unnecessarily to distort the mounting portion 12. Thus, the reflective surfaces 14 that are formed integrally with the mounting portion 12 can be also prevented from being distorted.

The polygon mirror 10 is mounted having the central axis of its mounting hole 12a in alignment with the central axis of the rotating shaft 32; that is, it is mounted without causing the mounting portion 12 to incline with respect to the rotating shaft 32. Therefore, all the protrusions 18 have the same height (or amount of projection from the lower surface 16a of the mounting portion 12). This height of the protrusions 18 can be adjusted by regulating the depth of molding holes for molding the protrusions 18, which are formed in a die for the injection molding of the polygon mirror 10. Since the protrusions 18 are three in number, for example, moreover, this adjustment is easy.

In FIG. 2B, numeral 34 denotes each of ejector pin traces that are formed when the polygon mirror 10 is injection-molded. These ejector pin traces 34 are formed lower than the aforesaid protrusions 18 on the lower surface 16a of the mounting portion 12.

Although these ejector pin traces 34 project from the lower surface 16a of the mounting portion 12, therefore, the protrusions 18, which are formed higher than the ejector pin traces 34, abut against the support surface 32b of the rotating shaft 32 with priority. Thereupon, the accuracy of mounting the polygon mirror 10 on the rotating shaft 32 can be prevented from being reduced.

Thus, with the engagement between the protrusions 18 and the support surface 32b of the rotating shaft 32, the polygon mirror 10 can be mounted on the rotating shaft 32 without being allowed unnecessarily to distort the mounting portion 12 and the reflective surfaces 14. Further, the polygon mirror 10 can be mounted with high accuracy with the central axis of the mounting hole 12a of the polygon mirror 10 aligned with the central axis of the rotating shaft 32, that is, without causing the mounting portion 12 to incline with respect to the rotating shaft 32.

The following is a description of operation for mounting the polygon mirror 10 on the rotating shaft 32 of the rotating body 30 to assemble a polygon mirror device 40.

As shown in FIG. 3, the polygon mirror 10 is put on the rotating shaft 32 of the rotating body 30, and the protuberance 32a of the rotating shaft 32 is inserted into the mounting hole 12a. The protrusions 18 that project from the lower surface 16a of the mounting portion 12 are caused to engage with the support surface 32b of the rotating shaft 32. As this is done, the mounting portion 12 can be located without being inclined with respect to the rotating shaft 32, since the protrusions 18 are formed having the same height as one another.

Thereafter, the screws 20 are passed individually through the through holes 18a that are formed in the protrusions 18 of the mounting portion 12 and are tightened. Thereupon, the respective distal ends of the screws 20 are threadedly fitted into the tapped holes 33 in the support surface 32b of the rotating shaft 32.

All the protrusions 18 are formed having the same height as another other. Therefore, with the engagement between the protrusions 18 and the support surface 32b of the rotating body 30, the mounting portion 12 can be prevented from being unnecessarily distorted, and besides, it can be mounted with high accuracy with the central axis of the mounting portion 12 aligned with the central axis of the rotating shaft 32. Thus, the reflective surfaces 14 that are formed integrally with the mounting portion 12 can be also mounted with high accuracy without being allowed to be unnecessarily distorted.

In this manner, the polygon mirror 10 is mounted on the rotating body 30 to form the polygon mirror device 40.

If the rotating means of the rotating body 30 is driven in this state, the entire polygon mirror device 40, including the rotating shaft 32 of the rotating body 30, rotates to switch or scan reflected light.

According to this embodiment, as described above, the following can be said.

The polygon mirror 10 is mounted on the rotating body 30 in a manner such that the plurality of protrusions 18 that are formed on the lower surface 16a of the mounting portion 12 abut against the support surface 32b of the rotating shaft 32. Since the protrusions 18 that then engage with the support surface 32b are equal in height, the polygon mirror 10 can be mounted with high accuracy with the central axis of its mounting hole 12a aligned with the central axis of the rotating shaft 32 of the rotating body 30 without inclination.

Since the polygon mirror 10 is fixed to the rotating shaft 32 by fastening with the screws 20, the mounting portion 12 and the reflective surfaces 14, that is, the polygon mirror 10, can be prevented from being distorted.

The polygon mirror 10 can be easily manufactured at low cost, since the mounting portion 12 and the reflective surfaces 14, its component elements, can be integrally molded from, for example, a resin material.

The respective angles of inclination of the reflective surfaces 14 of the polygon mirror 10 according to this embodiment to the central axis of the mounting hole 12a may be equal or slightly different from one another. Thus, the mounting portion 12 may or may not be in the shape of an equilateral hexagon.

Figure 4A:
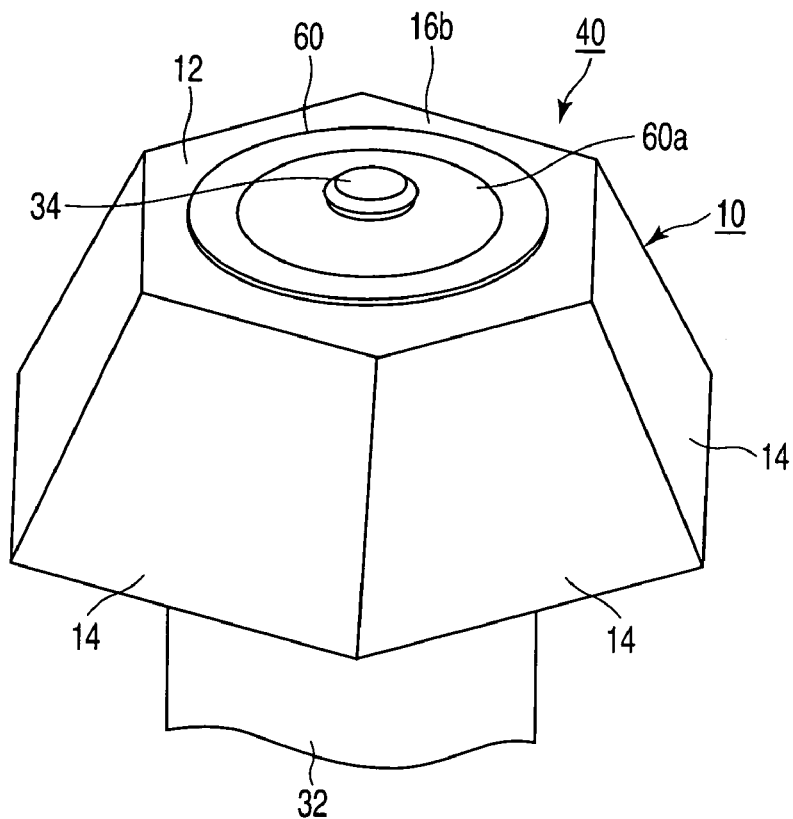
FIG. 4A is a schematic perspective view of a polygon mirror device according to a second embodiment.

A second embodiment will now be described with reference to FIGS. 4A to 5. This embodiment is a modification of the first embodiment. Therefore, like numerals are used to designate the same members as the ones described in connection with the first embodiment, and a detailed description of those members is omitted.

Figure 4B:
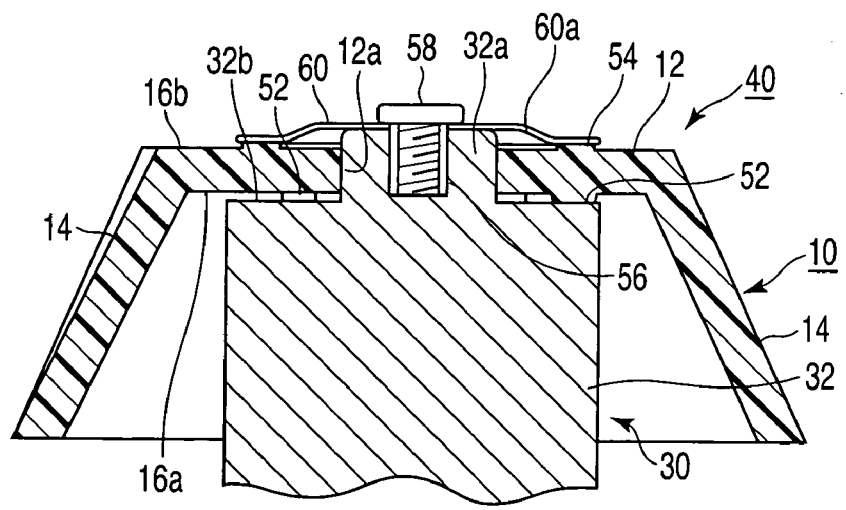
FIG. 4B is a schematic longitudinal sectional view of the polygon mirror device according to the second embodiment.

A polygon mirror 10 according to this embodiment shown in FIG. 4B has a plurality of first protrusions 52 on a lower surface 16a of a hexagonal mounting portion 12. These first protrusions 52 are formed individually in three positions at regular intervals and having the same height as one another. These first protrusions 52 are arranged individually in the same positions as the protrusions 18 described in connection with the first embodiment. When a rotating shaft 32 is attached to the mounting portion 12, therefore, the first protrusions 52 are caused to abut against a support surface 32b of the rotating shaft 32.

Figure 5:
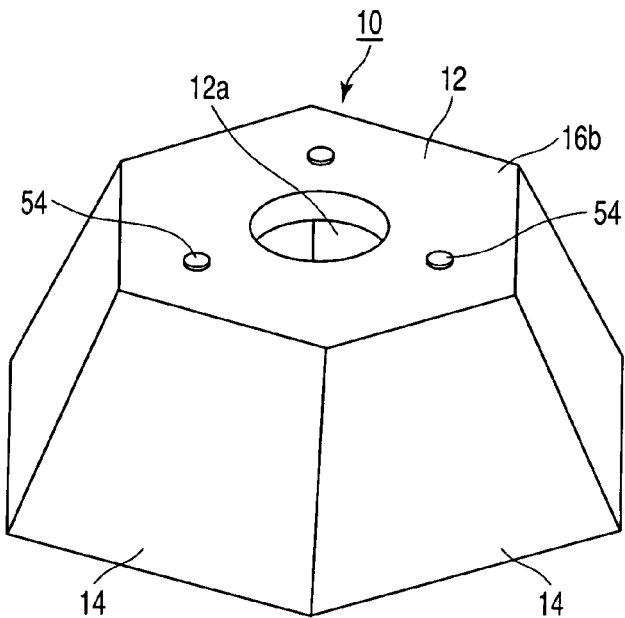
FIG. 5 is a schematic perspective view of a polygon mirror according to the second embodiment.

As shown in FIG. 5, second protrusions 54 are formed on an upper surface 16b, the other side opposite from the lower surface 16a or one side of the mounting portion 12. As shown in FIG. 4B, the second protrusions 54 are formed in back of the first protrusions 52 on the lower surface 16a. Thus, the first protrusions 52 and the second protrusions 54 are formed in opposite positions of the mounting portion 12. These second protrusions 54 are formed having the same height as one another. A spring member 60 (mentioned later) abuts against these second protrusions 54.

As shown in FIG. 4B, a tapped hole 56 is formed along the central axis of a protuberance 32a of the rotating shaft 32. A mounting screw 58 as a fastening member for mounting the spring member 60 on the rotating shaft 32 is threadedly fitted in the tapped hole 56.

The spring member 60 is formed of a thin metallic plate. As shown in FIG. 4A, the spring member 60 is in the shape of a disc when viewed flat. This spring member 60 is molded substantially in the shape of an umbrella that is highest at its top portion or central part and declines toward the peripheral edge portion. Thus, a conical surface 60a is formed such that it declines obliquely from its top portion toward its peripheral edge portion. Accordingly, the spring member 60 has a spring force that is produced by the conical surface 60a.

The top portion of the spring member 60 is formed having a tapped hole that serves as a mounting portion to be fitted on the protuberance 32a of the rotating shaft 32. Thus, the spring member 60 is held between the protuberance 32a of the rotating shaft 32 and the head of the spring 58 by the spring 58. Further, the diameter of the peripheral edge portion of the spring member 60 is set so that its lower surface engages with the second protrusions 54 on the upper surface 16b of the mounting portion 12.

The following is a description of operation for mounting the polygon mirror 10 on the rotating body 30 to assemble a polygon mirror device 40.

As shown in FIG. 4B, the polygon mirror 10 is put on the rotating shaft 32 of the rotating body 30, and the protuberance 32a of the rotating shaft 32 is inserted into the mounting hole 12a. The first protrusions 52 that project from the lower surface 16a of the mounting portion 12 are caused to engage with the support surface 32b of the rotating shaft 32. As this is done, the mounting portion 12 can be located without being inclined with respect to the rotating shaft 32, since the first protrusions 52 are formed having the same height as one another.

Thereafter, the spring member 60 is put on the upper surface 16b of the mounting portion 12 and the protuberance 32a of the rotating shaft 32. The mounting spring 58 is threadedly fitted into the tapped hole 56 of the protuberance 32a of the rotating shaft 32 through the tapped hole of the spring member 60. As this is done, the lower surface of the peripheral edge portion of the spring member 60 is caused to engage with the second protrusions 54 on the upper surface 16b of the mounting portion 12. Thus, the spring member 60 is held between the protuberance 32a of the rotating shaft 32 and the head of the spring 58 by the spring 58. Thereupon, the polygon mirror 10 is elastically pressed against the support surface 32b of the rotating shaft 32 by the pushing force of the spring member 60.

In this manner, the polygon mirror 10 is mounted on the rotating body 30 to form the polygon mirror device 40.

According to this embodiment, as described above, the following can be said.

In the polygon mirror device 40, the first protrusions 52 of the mounting portion 12 abut against the support surface 32b of the rotating shaft 32. Further, the spring member 60 applies a pushing force to the second protrusions 54. Thus, the first protrusions 52 of the mounting portion 12 can be caused securely and firmly to engage with the support surface 32b of the rotating shaft 32. As this is done, the mounting portion 12 can be mounted with high accuracy on the rotating shaft 32 without being distorted and with its central axis aligned with the rotating shaft 32 without inclination.

Since the polygon mirror 10 is pressed by the elastic force of the spring member 60, distortion of the polygon mirror 10 can be minimized. As this is done, the first protrusions 52 of the mounting portion 12 can be caused securely to engage with the support surface 32b of the rotating shaft 32 by the elastic force of the spring member 60, so that the polygon mirror 10 can be rotated steadily. Since the umbrella-shaped conical surface 60a is formed on the spring member 60, moreover, the polygon mirror 10 can be pressed against the rotating body 30 by the single spring member 60. Thus, the polygon mirror 10 can be pressed against the rotating body 30 by the use of a simple structure.

A third embodiment will now be described with reference to FIG. 6. This embodiment is a modification of the second embodiment. Therefore, like numerals are used to designate the same members as the ones described in connection with the second embodiment, and a detailed description of those members is omitted.

Figure 6:
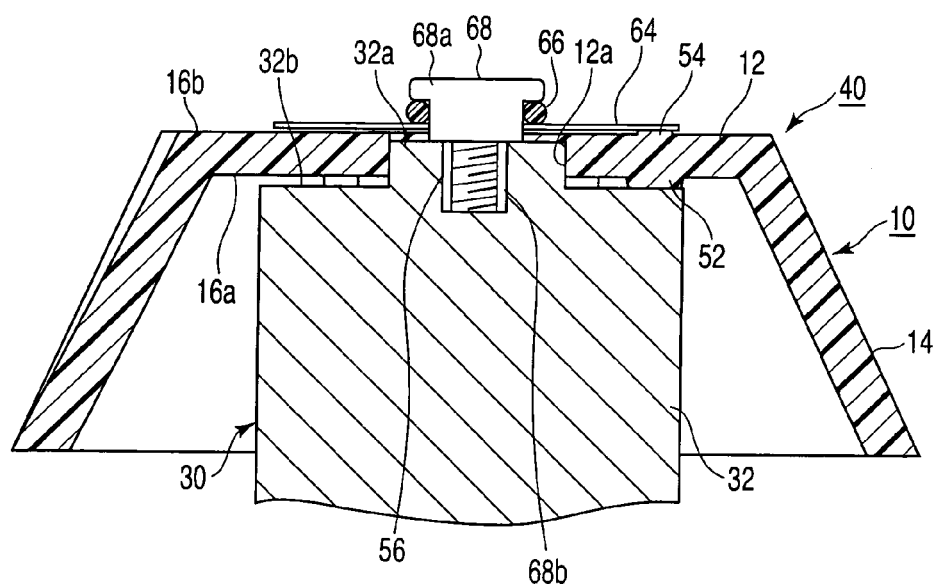
FIG. 6 is a schematic longitudinal sectional view of a polygon mirror device according to a third embodiment.

FIG. 6 shows a polygon mirror device 40 according to the third embodiment. In this embodiment, a polygon mirror 10 similar to the polygon mirror 10 used in the second embodiment is employed. Thus, three first protrusions 52 are formed at regular intervals on a lower surface 16a of a mounting portion 12. Second protrusions 54 are formed on an upper surface 16b of the mounting portion 12 opposite from the first protrusions 52.

The polygon mirror 10 is mounted on a rotating shaft 32 of a rotating body 30 by using a retaining plate 64, an elastic member 66, and a mounting screw 68 as a fastening member.

The retaining plate 64 is molded from a stiff metallic material, such as steel, SUS, or brass, or a high-stiffness plastic material, such as polycarbonate or PPS resin. This retaining plate 64 has a hole 64a in which a stepped portion 68a (mentioned later) of the screw 68 is located. As this retaining plate 64 is located on the side of the upper surface 16b of the mounting portion 12, it is caused to engage with the second protrusions 54 on the upper surface 16b.

The elastic member 66 is formed of a rubber O-ring or spring. This elastic member 66 is put on the stepped portion 68a (mentioned later) of the mounting screw 68, and presses the retaining plate 64 against the upper surface 16b of the mounting portion 12.

The mounting screw 68 has the stepped portion 68a as the head of the screw 68 and a thread portion 68b as a shank portion that is threadedly fitted in a tapped hole 56 of the rotating shaft 32.

The following is a description of operation for mounting the polygon mirror 10 on the rotating body 30 to assemble a polygon mirror device 40.

As shown in FIG. 6, the polygon mirror 10 is put on the rotating shaft 32 of the rotating body 30, and the protuberance 32a of the rotating shaft 32 is inserted into the mounting hole 12a. The first protrusions 52 that project from the lower surface 16a of the mounting portion 12 are caused to engage with the support surface 32b of the rotating shaft 32. As this is done, the mounting portion 12 can be located without being inclined with respect to the rotating shaft 32, since the first protrusions 52 are formed having the same height as one another.

Thereafter, with the elastic member 66 put on the stepped portion 68a of the mounting screw 68, the thread portion 68b is passed through the hole 64a of the retaining plate 64, and the thread portion 68b is threadedly fitted into the tapped hole 56 of the protuberance 32a of rotating shaft 32. By this threaded engagement, the retaining plate 64 is caused to engage with the second protrusions 54 through the elastic member 66.

In this manner, the polygon mirror 10 is mounted on the rotating body 30 to form the polygon mirror device 40.

According to this embodiment, as described above, the following can be said.

In the polygon mirror device 40, the first protrusions 52 of the mounting portion 12 abut against the support surface 32b of the rotating shaft 32. Further, the retaining plate 64 applies a pushing force to the second protrusions 54. Thus, the first protrusions 52 of the mounting portion 12 can be caused securely and firmly to engage with the support surface 32b of the rotating shaft 32. As this is done, the mounting portion 12 can be mounted with high accuracy on the rotating shaft 32 without being distorted and with its central axis aligned with the rotating shaft 32 without inclination.

Since the polygon mirror 10 is pressed by the retaining plate 64, distortion of the polygon mirror 10 can be minimized. As this is done, the first protrusions 52 of the mounting portion 12 can be caused securely to engage with the support surface 32b of the rotating shaft 32 by the elastic force of the elastic member 66, so that the polygon mirror 10 can be rotated steadily.

The elastic member 66 is interposed between the mounting screw 68 and the mounting portion 12. Since the elastic member 66 absorbs or damps vibration or displacement caused by rotation, the polygon mirror 10 can be rotated with stably.

A fourth embodiment will now be described with reference to FIGS. 7 to 9. This embodiment is a modification of the first and second embodiments. Therefore, like numerals are used to designate the same members as the ones described in connection with the first and second embodiments and those members which have the same functions, and a detailed description of those members is omitted.

Modifications of the first protrusions 52 formed on the mounting portion 12 of the polygon mirror 10 and described in connection with the second embodiment (including the protrusions 18 described in connection with the first embodiment) will be described in connection with this embodiment.

Figure 7:
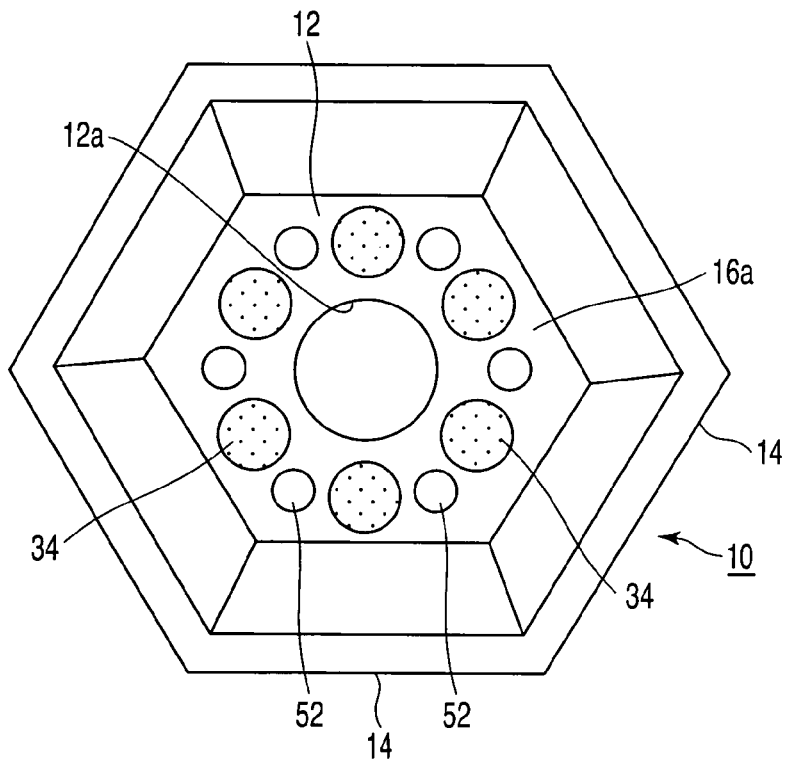
FIG. 7 is a schematic bottom view of a polygon mirror according to a fourth embodiment.
Figure 8:
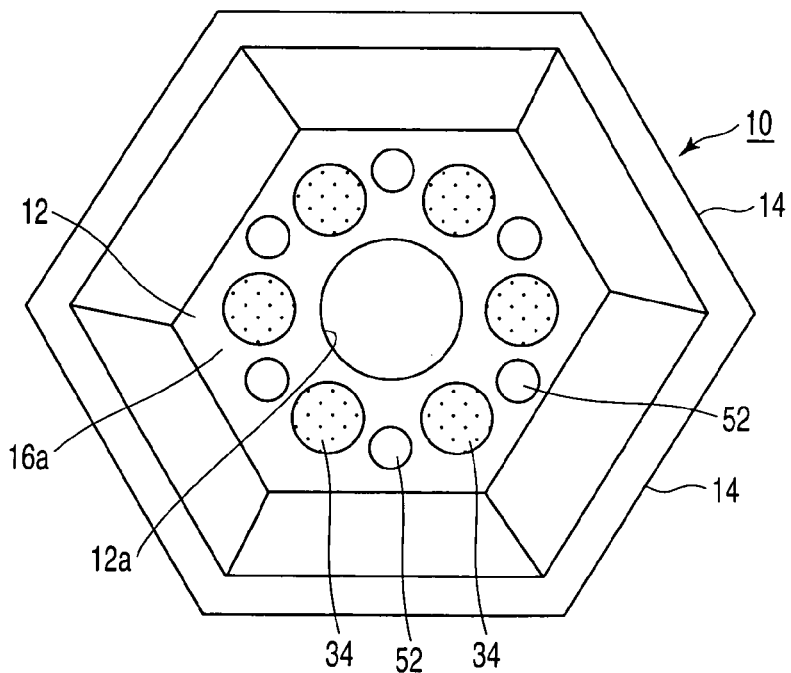
FIG. 8 is a schematic bottom view of the polygon mirror according to the fourth embodiment.

As shown in FIGS. 7 and 8, six first protrusions 52 are formed at regular intervals around a mounting hole 12a.

As shown in FIG. 7, the first protrusions 52 are formed in positions corresponding to regions near ridges or boundaries between reflective surfaces 14. Ejector pin traces 34 are formed individually between the first protrusions 52.

As shown in FIG. 8, the first protrusions 52 are formed in positions corresponding to regions near lines of intersection between the reflective surfaces 14 and a mounting portion 12. Thus, the first protrusions 52 are formed in positions corresponding individually to the reflective surfaces 14 and the respective ridges of the reflective surfaces 14. Ejector pin traces 34 are formed individually between the first protrusions 52.

Figure 9:
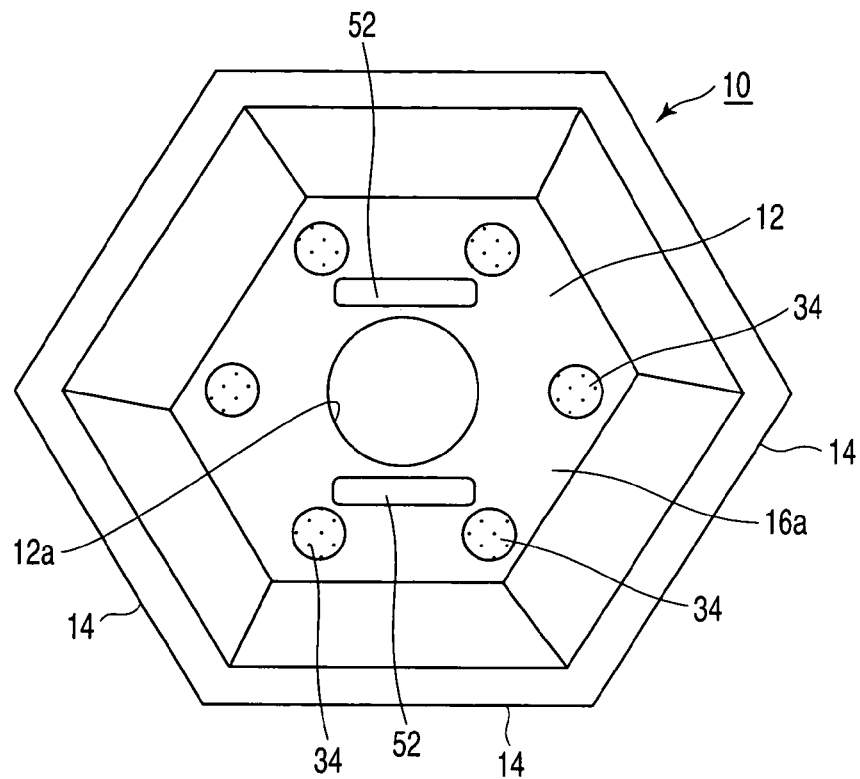
FIG. 9 is a schematic bottom view of the polygon mirror according to the fourth embodiment.

As shown in FIG. 9, two first protrusions 52 are formed on a lower surface 16a of a mounting portion 12. The first protrusions 52 are oblong. These first protrusions 52 are arranged in symmetrical positions with a mounting hole 12a between them. Thus, these first protrusions 52 are arranged parallel to each other.

According to this embodiment, as described above, the following can be said.

The first protrusions 52 shown in FIGS. 7 to 9 abut against a support surface 32b of a rotating shaft 32, so that a polygon mirror 10 can be mounted on the rotating shaft 32 with their respective central axes in alignment with each other without inclination. Thus, the polygon mirror 10 can be mounted on a rotating body 30 without play.

A pushing force and fixing force that are applied in mounting the polygon mirror 10 on the rotating shaft 32 can be dispersed by the first protrusions 52. Thus, the polygon mirror 10 can be stably mounted on the rotating shaft 32, and distortion of the polygon mirror 10 can be minimized.

A fifth embodiment will now be described with reference to FIGS. 10 to 11B. This embodiment is a modification of the first embodiment. Therefore, like numerals are used to designate the same members as the ones described in connection with the first embodiment and those members which have the same functions, and a detailed description of those members is omitted.

Figure 10:
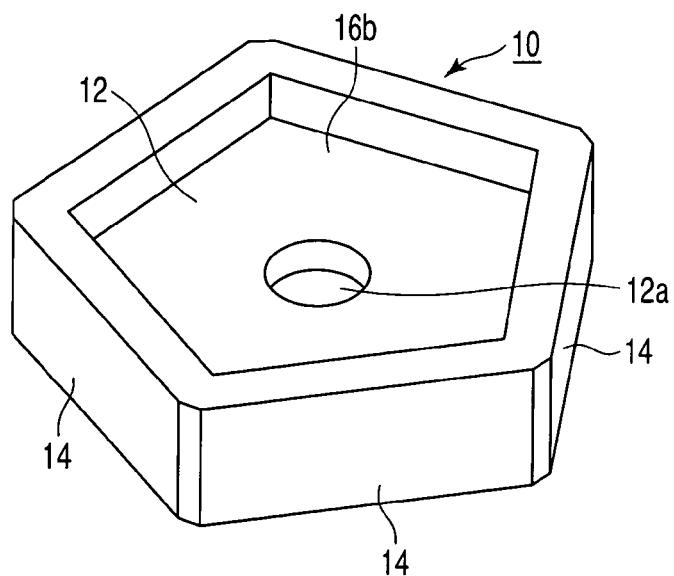
FIG. 10 is a schematic perspective view showing the top side of a polygon mirror according to a fifth embodiment.
Figure 11A:
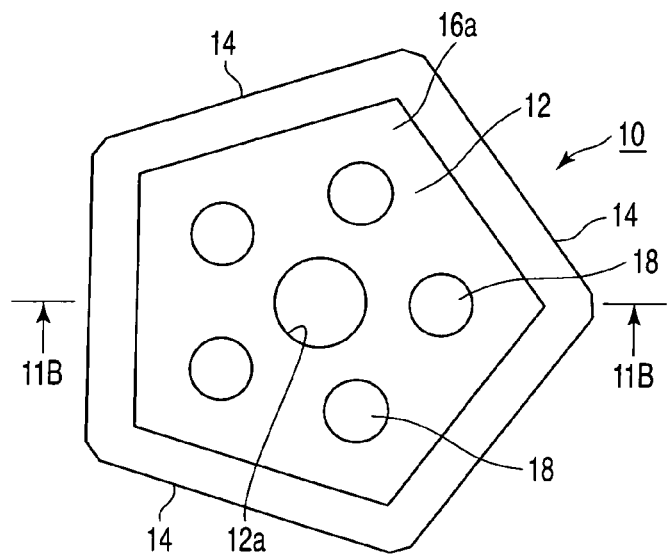
FIG. 11A is a schematic bottom view of the polygon mirror according to the fifth embodiment.
Figure 11B:
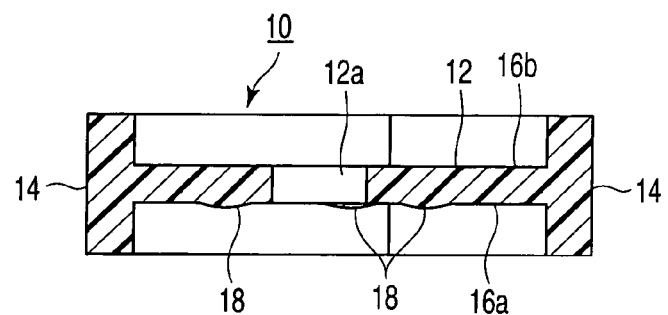
FIG. 11B is a schematic longitudinal sectional view of the polygon mirror according to the fifth embodiment taken along line 11B-11B of FIG. 11A.

FIGS. 10 to 11B show a polygon mirror 10 according to the fifth embodiment. This polygon mirror 10 includes a mounting portion 12 and a plurality of (or five) reflective surfaces 14 that extend parallel to the rotation axis of a mounting hole 12a in the mounting portion 12. The polygon mirror 10 is molded having a pentagonal plane shape.

As shown in FIGS. 10 to 11B, the mounting hole 12a is bored through the central part of the mounting portion 12 to be mounted on the rotating shaft 32. As shown in FIG. 11B, the mounting portion 12 is formed on intermediate portions of the reflective surfaces 14 with respect to their height direction. Thus, the reflective surfaces 14, which extend parallel to the central axis of the mounting hole 12a, are formed integrally on edge portions of the mounting portion 12.

As shown in FIG. 11A, a plurality of protrusions 18 are formed in a lower surface 16a or one side face of the mounting portion 12. These protrusions 18 are formed individually in five positions at regular intervals around the mounting hole 12a. These protrusions 18 are arranged in positions corresponding to regions near ridges or boundaries between the reflective surfaces 14. As shown in FIG. 11B, these protrusions 18 are formed by swelling the lower surface 16a of the mounting portion 12 into a substantially spherical surface. These protrusions 18 are formed having the same height as one another.

According to this embodiment, the following can be said.

In mounting the polygon mirror 10 on the rotating body 30, the spherically swollen protrusions 18 of the mounting portion 12 are caused to abut against the support surface 32b of the rotating shaft 32, so that the polygon mirror 10 can be mounted on the rotating shaft 32 with their respective central axes in alignment with each other without inclination. Thus, the polygon mirror 10 can be mounted with high accuracy.

A sixth embodiment will now be described with reference to FIG. 12. This embodiment is a modification of the first embodiment. Therefore, like numerals are used to designate the same members as the ones described in connection with the first embodiment and those members that have the same functions, and a detailed description of those members is omitted.

Figure 12:
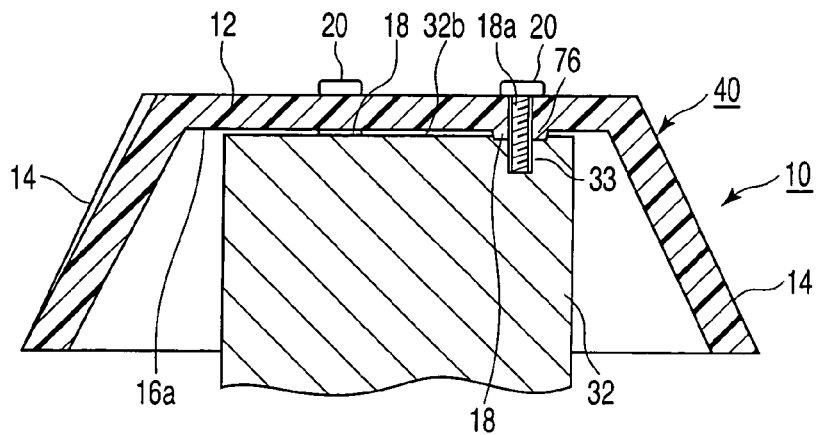
FIG. 12 is a schematic longitudinal sectional view of a polygon mirror device according to a sixth embodiment.

FIG. 12 shows a polygon mirror device 40 according to the sixth embodiment. This polygon mirror device 40 includes a polygon mirror 10 and a rotating body 30 that has a rotating shaft 32 on which the polygon mirror 10 is mounted.

In this embodiment, the mounting hole 12a is not formed in a mounting portion 12. A protuberance 32a is removed from the rotating shaft 32. A support surface 32b is formed on the distal end of the rotating shaft 32. Further, recesses 76 corresponding to protrusions 18 are formed in the support surface 32b. The recesses 76 have a shape, depth, and size such that their corresponding protrusions 18 can be fitted in them. Furthermore, a tapped hole 33 is formed in each of the recesses 76. When the recesses 76 are fitted in the protrusions 18, individually, the central axis of the rotating shaft 32 and the center of the mounting portion 12 are aligned with each other.

The protrusions 18 are formed in positions on a lower surface 16a of the mounting portion 12 of the polygon mirror 10. Each protrusion 18 is formed having a through hole 18a that is penetrated by a screw 20 for use as a fastening member.

The following is a description of operation for mounting the polygon mirror 10 on the rotating shaft 32 of the rotating body 30 to assemble the polygon mirror device 40.

As shown in FIG. 12, the polygon mirror 10 is put on the rotating shaft 32 of the rotating body 30, and the protrusions 18 that project from the lower surface 16a of the mounting portion 12 are caused to engage with the recesses 76 of the support surface 32b of the rotating shaft 32.

Thereafter, the screws 20 are passed individually through the through holes 18a that are formed in the protrusions 18 of the mounting portion 12 and are tightened. Thereupon, the respective distal ends of the screws 20 are threadedly fitted into the tapped holes 33 in the recesses 76 of the support surface 32b of the rotating shaft 32.

All the protrusions 18 are formed having the same height as another other. Therefore, with the engagement between the protrusions 18 and the support surface 32b of the rotating body 30, the mounting portion 12 can be prevented from being unnecessarily distorted, and besides, it can be mounted with high accuracy with the central axis of the mounting portion 12 aligned with the central axis of the rotating shaft 32. Thus, the reflective surfaces 14 that are formed integrally with the mounting portion 12 can be also mounted with high accuracy without being allowed to be unnecessarily distorted.

In this manner, the polygon mirror 10 is mounted on the rotating body 30 to form the polygon mirror device 40.

According to this embodiment, as described above, the following can be said.

In the polygon mirror device 40, the respective distal end faces of the protrusions 18 are caused individually to abut against the bottom surfaces of the recesses 76, and the outer peripheries of the protrusions 18 are fitted individually into the inner peripheries of the recesses 76. Thus, the polygon mirror 10 can be positioned with high accuracy when it is mounted on the rotating shaft 32 with their respective central axes in alignment with each other without inclination.

Since the mounting hole 12a is not formed in the mounting portion 12, there is no possibility of weld lines being generated as the polygon mirror 10 is molded. Because of the degree of freedom of layout of the gate position and ejector pin position for injection molding, dies can be designed with ease.

Although some embodiments have been specifically described herein with reference to the drawings, this invention is not limited to these embodiments, but encompasses any and all embodiments within the scope of the invention.

What is claimed is:

1. A polygon mirror comprising:
a plate-like mounting portion in a shape of a polygon mounted on a rotating body having a support surface;
a plurality of reflective surfaces formed integrally with the mounting portion and arranged around the rotating body so as to surround the rotating body; and
a plurality of protrusions provided on one side of the mounting portion and configured to abut against the support surface of the rotating body, wherein each protrusion has a through hole which is penetratable by a fastening member for mounting on the rotating body,
wherein the polygon mirror is formed by a thermoplastic resin.

2. A polygon mirror according to claim 1, wherein the mounting portion has a flat surface, and the protrusions project at a same height from the flat surface of the mounting portion.

3. A polygon mirror device comprising:
a rotating body having a support surface;
a plate-like mounting portion in a shape of a polygon to be mounted on the rotating body;
a plurality of reflective surfaces formed integrally with the mounting portion and arranged around the rotating body as to surround the rotating body;
a plurality of protrusions provided on one side of the mounting portion and configured to abut against the support surface of the rotating body, wherein each protrusion has a through hole; and a fastening member penetrating through each hole for mounting on the rotating body, wherein each of the plate-like mounting portion, the reflective surfaces and the protrusions are formed by a thermoplastic resin.

4. A polygon mirror device according to claim 3, wherein the mounting portion has a flat surface, and the protrusions project at a same height from the flat surface of the mounting portion.

* * * * *